April 9, 1940.  J. O. GETTE, JR  2,196,585
TORQUE MULTIPLYING DEVICE
Filed Feb. 5, 1934   2 Sheets-Sheet 1
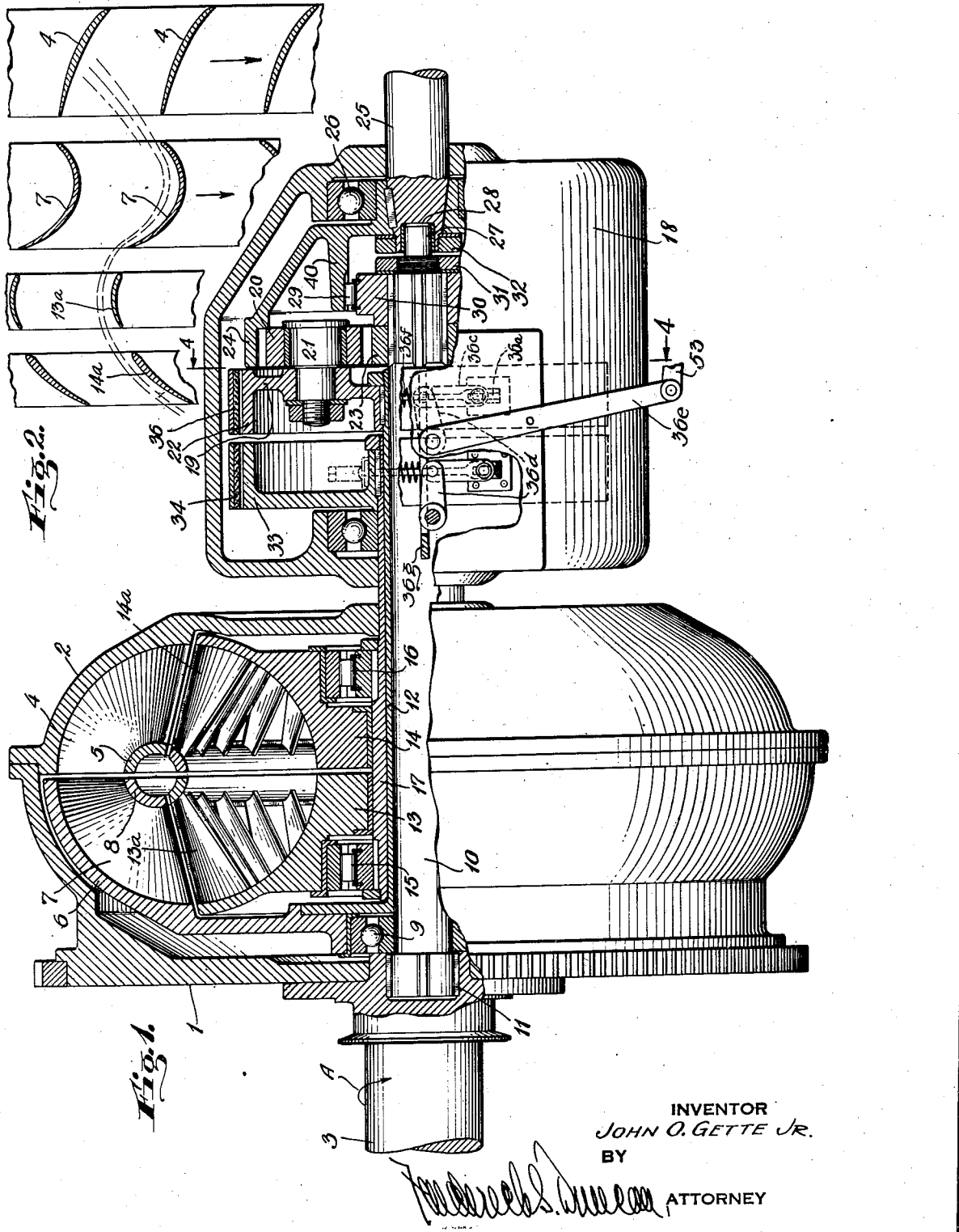
INVENTOR
JOHN O. GETTE JR.
BY
ATTORNEY April 9, 1940. J. O. GETTE, JR 2,196,585
TORQUE MULTIPLYING DEVICE
Filed Feb. 5, 1934 2 Sheets-Sheet 2
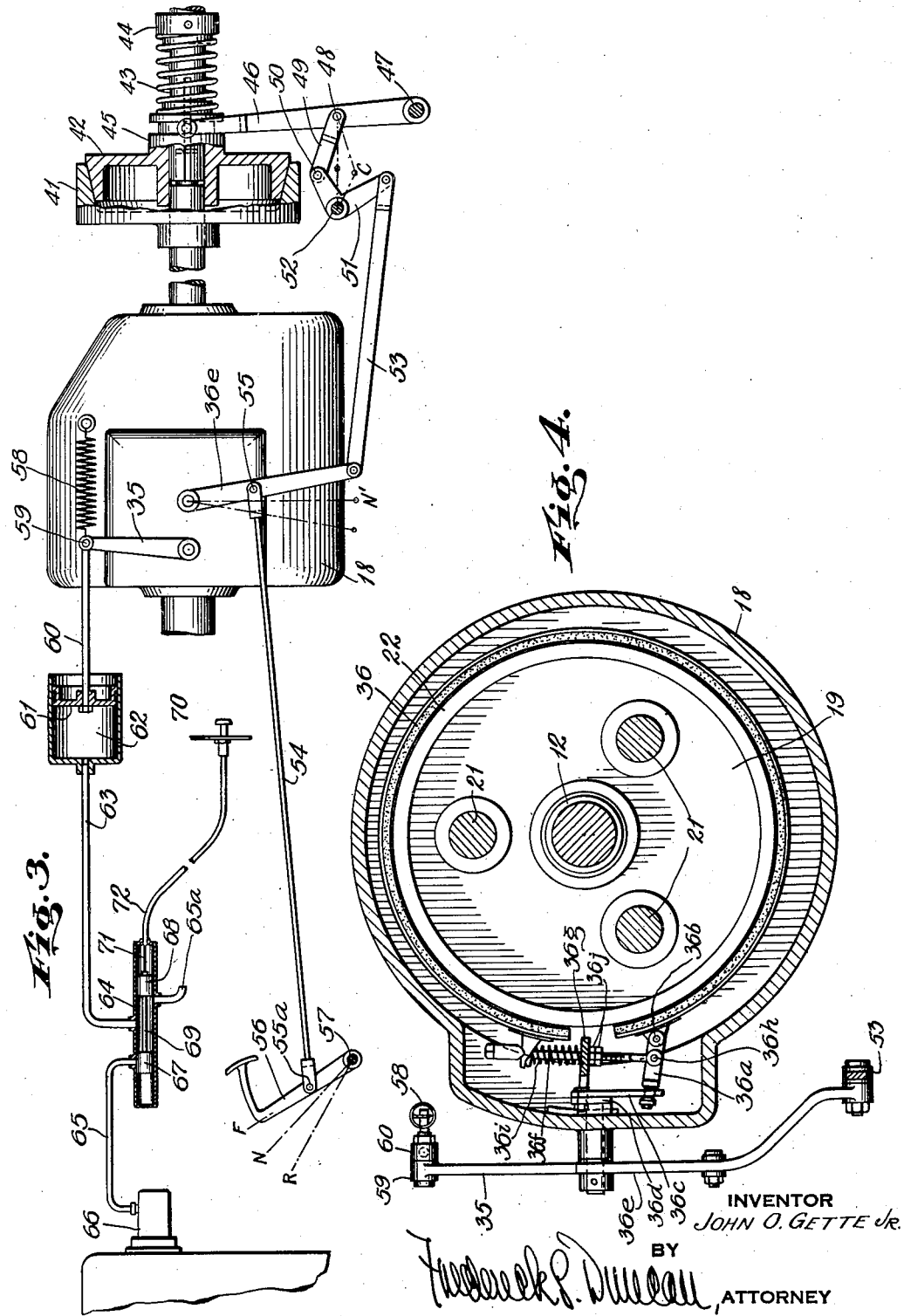
INVENTOR
JOHN O. GETTE JR.
BY
ATTORNEY Patented Apr. 9, 1940

2,196,585

UNITED STATES PATENT OFFICE 2,196,585

TORQUE MULTIPLYING DEVICE

John O. Gette, Jr., Yonkers, N. Y.

Application February 5, 1934, Serial No. 709,749

13 Claims. (Cl. 74—189.5)

The invention relates to improvements in power transmitting mechanism of the type in which liquid, usually oil, is the working substance, the liquid being driven by an impeller constituting the driving member and designed to impart a vortical motion to the liquid whereby the velocity energy in the liquid is absorbed by a turbine that constitutes the driven member. Such mechanisms are often provided with fixedly mounted vanes or blades serving as reaction members, against which the liquid discharged from the turbine is guided and by which it is directed back to the intake side of the impeller, whereby the torque and relative speed ratios of the driving and driven members will automatically vary. The efficiency of such devices is, however, at its highest only when the difference in speed between the driving member and the driven member is a predetermined amount fixed by the design of the blading members, falling off rapidly as this difference increases or decreases. In the case of automobile transmissions, it is obviously desirable that such a device have maximum efficiency at a one-to-one speed ratio of the driving and the driven shafts for the reason that the automobile is usually traveling under conditions in which this ratio is suitable. Under other conditions, however, a torque multiplication between the driving shaft and the driven or propeller shaft of as high as four, and perhaps even higher, is necessary—such conditions existing, for example, in starting, particularly on an upgrade. If, however, the transmission be designed for greatest efficiency at a one-to-one ratio, its efficiency drops very substantially when operating on the high torque multiplication required as above stated. In the present device I provide means whereby the speed of the turbine or the "runner," as it is sometimes called, is, in spite of the increase in torque multiplication between the driving shaft and the driven shaft, maintained nearer the impeller speed than it would otherwise be. This means that the blading can be designed for its maximum efficiency at nearly a one-to-one speed ratio and that its efficiency at higher speed ratios of impeller and turbine will not fall off rapidly enough to prevent effective use of the device as an automobile transmission.

The physical embodiment of the invention which I prefer for carrying out the above stated object is a planetary gearing system, in which a gear fixedly mounted on the driving shaft serves as a sun gear, a gear mounted on the turbine serves as an intermediate planetary gear, and an internal gear mounted on the driven shaft serves as a third or outer gear. As will be made plain in the course of the description of the mechanism, the function of the gearing is to feed back to the impeller much of the energy which would otherwise be lost at torque ratios of more than one-to-one. The advantages of this feed-back or, as it may be called, "regenerative" system, lies in the fact that the impeller and turbine are always operating more nearly at their best speed ratio, the torque multiplication possible is greater, and difficulties of design for a large range of torque ratio variation are much reduced. As will also be pointed out, the gearing abovementioned is made use of to provide a simple and easily controlled means for reversing the direction of rotation of the driven shaft.

In addition, the reaction members, which I have already referred to and which may be for convenience also designated as the "guide members," are so mounted that they are free to rotate in the direction of rotation of the impeller and turbine when the resultant energy direction of the liquid discharged from the turbine attains a predetermined angle, the curvature of the guide members being preferably so fixed that, as the difference in speeds of the impeller and turbine approaches zero, first one guide member will rotate in the direction of the impeller and then the other. This effect is preferably accomplished by mounting the guide members on overrunning clutches which restrain them from rotation when they are functioning as reaction members (i. e., when the turbine discharge tends to force them back) but permit them to rotate in the opposite direction when not so functioning, an action which, as above stated, preferably takes place progressively as a zero difference of speeds is approached. Provision is also made for releasing the guide members regardless of comparative speeds of impeller and turbine, whereby the device may operate as a fluid clutch, engine racing under normal driving conditions being thereby prevented.

Reference is made to the accompanying drawings forming a part of this specification, in which Fig. 1 is an elevation of the mechanism partly in section and Fig. 2 is a development in a plane, of the impeller, turbine, and reaction members and showing the hydraulic circuit;

Fig. 3 is a view in elevation, partly in section, showing a system of controls especially adapted for an automobile for operating the propeller shaft clutch, the reversing brake, and the brake for restricting rearward motion of the guide members and for releasing them to permit such rearward motion;

Fig. 4 is a view on the line 4—4 of Fig. 1 and, in all essential details, serves as a cross-section view of the brake assembly for controlling the guide members.

Referring to the drawings, a housing or casing composed of the parts 1 and 2 is fixedly connected with the driving shaft 3, the part 2 carrying the impeller unit comprising, in addition to the housing, blades or vanes 4 and the core ring 5, the blades being so curved and pitched as to take in and discharge liquid when the driving shaft is rotating in the direction of the arrow A, which, for convenience of explanation in this specification, will in all cases be assumed to be the direction of rotation of the driving shaft. The turbine composed of the casing 6, turbine blades 7, and core ring 8 is mounted to freely rotate on ball bearings 9 on the stud shaft 10 splined to the driving shaft 3, as shown at 11. The turbine blades are of such curvature and pitch that liquid discharged from the impeller blades 4 will cause the turbine to rotate in the same direction as the impeller. If the device is to be used as an automobile transmission, the design of the turbine and impeller blading will preferably be such as to be most efficient at a nearly one-to-one ratio of speeds of driving and driven shafts, which is the condition existing, for example, when the car is traveling over a level road.

Fixedly connected to the turbine casing 6 is a sleeve 12 rotatably mounted on the stud shaft 10 whereby the sleeve and stud shaft may rotate independently of each other. The guide vane rings 13 and 14 with guide vanes 13a and 14a respectively are mounted by means of one-way roller clutches 15 and 16 on a second sleeve 17 rotatably mounted on the sleeve 12, these clutches serving to permit free rotation of the guide members in the direction of the arrow A but preventing rotation of the guide members in the opposite direction. The sleeve 17, as well as the sleeve 12 and the stud shaft 10, extends into a second housing 18 which is stationary, being fixedly mounted on any machine or apparatus in which the mechanism may be installed.

Keyed to the sleeve 12 is a carrier which may consist of a ring or spider 19 carrying preferably several planet gears, of which one is indicated by the numeral 20, the gears being mounted on the ring by suitable means such as the stub shaft 21, the ring or spider 19 being provided with a brake drum 22 for purposes to be hereinafter explained. The gear or gears 20 mesh with a sun gear 23 fixed by splining, or otherwise, on the stud shaft 10, and they also mesh with an internal orbit gear 24 keyed to the driven shaft 25. The gear 24 is rotatably mounted in the housing 18 on ball bearings 26 as shown, and the stub shaft preferably is provided with a stud 27 which extends into the bearing 28 of the driven shaft. The internal gear 24 is also rotatably supported by the one-way clutch 29 traveling on the roller race 30 splined on the stud shaft 10, this clutch being in operation only when the propeller shaft is rotated in the direction of the arrow A and at a speed faster than the speed of rotation of the driving shaft. Suitable nuts 31 and 32 retain the roller race 30 and the internal gear 24 respectively in position.

As has been already pointed out, the driven shaft 25 under ordinary conditions rotates in the same direction as does the driving shaft. However, it is frequently desired, for example in the case of automobile transmissions, to reverse the direction of rotation of the driven shaft without changing the direction of rotation of the driving shaft. To accomplish this purpose I provide the brake band 36 and suitable mechanism for causing it, when desired, to engage the brake drum 22. The power for this purpose may be applied to the brake band 36 by a train of conventional brake operating mechanism, consisting of a link 36a pivoted to one end of the brake band at 36b and also to a link 36c. The link 36c is pivoted to a crank arm 36d, the crank arm being oscillatable by the lever 36e. A pull rod 36f is pivotally connected to the opposite end of the brake band 36 and passes through the bracket 36g, being pivotally connected to the link 36a at 36h. The spring 36i normally maintains the brake band clear of the brake drum 22, while the nuts 36j establish a maximum clearance for the brake band. When it is desired that the driven shaft 25 rotate in the same direction as the driving shaft 3, the brake band 36 is free from the brake drum 22. On the other hand, when this brake band 36 is contracted on the brake drum 22, the planetary gear 20 has no orbital motion and, since the gear 23 is rotating, it causes the internal gear 24 and consequently the driven shaft 25 to rotate in a direction opposite to the direction of rotation of the driving shaft 3.

On the sleeve 17 is mounted a brake drum 33 on which operates a brake band 34 controlled from the exterior of the housing 18 by means of the brake lever 35 and a train of conventional brake expanding and contracting mechanism similar to that used for operating the reverse brake as hereinbefore described. It will be observed that with this brake, which I will term the "reaction" brake, set, the guide members can rotate in one direction only, but that, with the brake band released, they may freely rotate in both directions.

When the device is used as an automobile transmission and probably when used in many other mechanisms, the operator frequently desires to disconnect the driving wheels or other load from the transmission, and for this purpose there may be interposed in the propeller shaft a clutch which may be of any desired type suitable for the purpose, but which I have shown in Fig. 3 as of the conventional cone type. The driving section of the propeller shaft is provided with an outer cone 41, and the driving section of the propeller shaft is provided with an inner cone 42 normally pressed into engagement with the cone 41 by the spring 43 abutting against the fixed stop 44 and against the groove collar 45, which may constitute a part of the inner cone 42. The inner cone 42 with the collar 45, of course, is slidable but non-rotatably mounted on the driven section of the propeller shaft. By means of the lever 46 pivoted at some fixed part of the vehicle at 47, the clutch may be engaged and disengaged at will. A suitable system for operating the clutch and the reversing brake by a single pedal will now be described.

To the lever 46 is pivoted at 48 a link 49 which, in turn, is pivoted at 50 to a bell crank lever 51 fulcrumed at 52 to a fixed part of the vehicle. The opposite end of the bell crank lever 51 is connected by means of a link 53 with the lever 36e by which the reverse brake band is engaged and released. The link 54 pivoted at 55 on the lever 36e is also pivoted at 55a to the pedal lever 56 pivoted at 57 to a fixed portion of the vehicle.

When the pedal is at the position F, the clutch is in engagement, and the reverse brake is released. In other words, the entire system is in condition for normal forward propulsion of the vehicle. When the pedal is partially depressed—say to the position N—the pivot point 50 moves into line with the pivot points 52 and 48 whereby the clutch is disengaged, the reverse brake being still released. If the pedal be further depressed—say to the position R—the pivot point 50 moves to the point C, consequently permitting engagement of the propeller shaft clutch and at the same time engaging the brake band 36.

I also show means adapted for use in connection with the device when mounted in an automobile for operating the brake band 34 in order to release the guide members when it is desired that the device operate after the manner of a simple fluid clutch. The brake and the brake operating mechanism used in connection with the brake drum 33 is similar to that used in connection with the reversing brake except for the immaterial difference that the arm 35, which controls it, extends upwardly and the brake is normally maintained in engagement with the brake drum 33 by the tension spring 58. The arm 35 is pivotally connected at 59 with the shaft 60 of the piston 61, which works in the cylinder 62. The tube 63 leads from the cylinder 62 to the small cyinder 64, and the tube 65 leads from the cylinder 64 to the intake manifold of the vehicle or to some point such as 66, which communicates with the intake manifold. A double piston consisting of the two units 67 and 68 connected by the rod 69 can reciprocate in the small cylinder 64, being controlled preferably from the dash 70 of the vehicle by a "Bowden" wire arrangement consisting of the shaft 71 and casing 72. If the double piston is moved to the left from the position shown in Fig. 3, it can be so placed as to connect the pipes 65 and 63 and hence permit the atmospheric pressure to operate on the piston 61 to release the brake band 34. In the position shown in Fig. 3—that is, the position at which the reaction brake is engaged (its normal position), the pipe 65 is closed, the pipe 63 opens freely into the cylinder, which has an intake 65a, and atmospheric pressure will be consequently created on both sides of the piston 61, permitting the spring 58 to act to engage the reaction brake.

In the drawings of the mechanism I have omitted, except in a few instances, features of conventional design, such as gaskets, special types of bearings, lubricating systems, oil leakage return systems and the like, and features of construction that are advantageous merely from the manufacturing and assembly standpoint, thus confining the showing of the drawings to the essentials necessary to illustrate the device and its mode of operation. The same is true as to the specification, nearly all matters of conventional design and material being left to the discretion and judgment of those acquainted with such matters.

I will now describe the mode of operation of the mechanism, referring for the purpose especially to Fig. 2.

The operation of the device may be made clear by first assuming the maximum difference of speeds between the driving shaft and driven shaft of which the device is capable and then carrying the explanation through intermediate stages to the opposite extreme at which this difference is zero or nearly so.

It will be obvious that the maximum possible difference in speeds between the impeller and turbine is dependent upon the planetary gear ratio—for example, if the sun gear 20 be one-third the diameter of the internal gear 24, the angular speed of the impeller cannot, under any circumstances, be greater than four times the angular speed of the turbine (except if the propeller shaft be rotated against the engine). This would be the condition if rotation of the driven shaft 25 were entirely prevented, as, for example, if the driven shaft were stalled. The angular velocity of the planet gear carrier 19 will, when the driven shaft is turning slower than the driving shaft, always be less than the angular velocity of the sun gear 23, due to the gear ratios between the sun, planet, and orbit gears. Since the impeller unit 2 is fixedly connected with the driving shaft 3 carrying the sun gear 23 and the turbine unit 6 is fixedly connected to the planet gear carrier 19, the angular velocity of the impeller 2 will always be the same as that of the sun gear 23. Furthermore, when the orbit gear is stationary as under stalling conditions, the angular velocity of the turbine unit 6 will be the same as that of the planet gear carrier 19 and less than the angular velocity of the sun gear 23. The fluid flowing from the impeller 2 through the turbine 6 will have a tendency to cause the turbine 6 to increase its angular velocity and to rotate the planet gear carrier at a greater angular velocity than that determined by the planetary gears. This results in additional force being applied to the sun gear in the same direction of rotation as that imparted directly by the driving shaft 3. With the efficiency of power transmission fixed by design of the blading of the impeller, turbine and guide member at its maximum at a one-to-one speed ratio of driving and driven shafts, this efficiency becomes considerably reduced under the assumed conditions at which the difference in speed between the impeller and turbine is a maximum. Of coure, if the efficiency of power transmission at the assumed speed ratios were one hundred per cent, then the torque on the turbine would be four times the torque on the impeller. However, such is never, in fact, the case, and, therefore, the torque on the turbine shaft becomes reduced to a figure based upon the efficiency of power transmission. Assuming, for instance, an impeller torque of 100 lb. ft. and an efficiency of power transmission from impeller to turbine (with the propeller shaft stalled) of 70%, then the turbine torque would be 280 lb. ft. Of that 280 lb. ft., the planetary gear system causes one-fourth to be fed back to the flywheel to urge the latter in the direction of rotation in which it is turning, and three-fourths to be impressed on the driven (propeller) shaft. The net input, therefore, would be 30 lb. ft.—that is, the difference between 100 lb. ft. and one-fourth of the turbine torque. Consequently, the output torque, i. e., the torque on the driven (propeller) shaft, would be the difference between the torque on the turbine shaft and 70 lb. ft., the latter figure being the difference between the impeller torque and the net input torque. It follows that, although the torque multiplication between impeller and turbine shaft is, under the assumed conditions, only 2.8 to 1, the torque multiplication between the driving shaft and the driven (propeller) shaft is 7 to 1.

Next, let it be assumed that the driven shaft 25 begins to rotate under its load, its torque resistance decreasing. As this torque resistance becomes less, the difference between impeller and turbine speeds also becomes less, with a consequent change in the velocity direction of the liquid discharged from the turbine blades. While, with the propeller shaft stalled—which was the condition first assumed—the directional velocity of the liquid was mainly tangential of the casing in a direction opposite to the direction of rotation of the turbine and under which conditions its energy was so directed as to react against both guide members, it will now be seen that, as the difference between impeller and turbine speeds becomes less, the direction of the discharge from the turbine becomes more and more axial (with respect to the impeller and turbine). As the change from a tangential to an axial direction continues and passes the axial direction, the first effect is that the liquid impinges on the blades of the guide member 13 at such an angle as to cause it to move in the direction of rotation of the turbine, which it may do by virtue of its overrunning clutch mounting. It thus ceases to function as a reaction member, leaving the guide member 14 as the only functioning guide member. As the torque resistance of the propeller shaft 25 continues to decrease further, the difference between impeller and turbine speeds continues to decrease until the discharge from the turbine blades strikes the blades of the guide member 14 at such an angle as to cause this guide member also to move in the direction of rotation of the turbine. The object of providing two guide members and of causing them to progressively cease to function as the difference between impeller and turbine speeds decreases is, of course, to maintain as high as possible the efficiency of power transmission while the apparatus is functioning as a torque multiplier. In some cases,—for instance in an automobile transmission, where torque multiplication is not ordinarily required in excess of a ratio of 3 or 4 to 1, I find that one guide member—for instance, the guide member 14—works reasonably efficiently through the required range. On the other hand, if a torque multiplication through a much wider range is desired, it would be advisable to provide several such guide members designed to yield successively as impeller and turbine speeds approach uniformity.

As the speed difference between impeller and turbine decreases, another effect is taking place arising out of the planetary motion connection between the turbine, propeller shaft, and driving shaft—namely, a change in the distribution of turbine power output between the driving shaft and the propeller shaft. While, in the stalled condition of the propeller shaft assumed above, all of the turbine power output was impressed on the driving shaft, this condition changes as the turbine and impeller shafts approach uniformity of speed until, at nearly uniform speeds of these two members (at which there is little or no torque multiplication), three-fourths of the turbine power output is impressed on the driving shaft and only one-fourth is impressed on the propeller shaft. In other words, at this stage, the planetary gears 20 have nearly ceased rotating on their axes. Of course, it is to be understood that absolute cessation of rotation of the gears 20 on their axes would seldom happen in practice and even in the exceptional cases only casually; such, for example, as in the case of an automobile when the propeller shaft is driven by the traction wheels at the same speed as the driving shaft.

Another way of explaining the effect of the planetary gear system is by assuming certain driving shaft (or impeller) speeds and certain propeller shaft speeds from which the speed of the turbine is readily calculable from the planetary gearing ratio. Assume, then, that the device is installed in an automobile of the conventional type, that the driving shaft is rotating for example at a speed of 2000 revolutions per minute, and that the driven shaft is rotating at a lesser speed due to torque resistance impressed upon it—say, for example, 500 revolutions per minute. If the turbine were directly connected to the propeller shaft, the turbine itself would, of course, be rotating under such conditions at the same speed as the propeller shaft—namely, 500 revolutions per minute. However, when the turbine is geared to the propeller shaft and the driving shaft by the planetary gearing system which I have described, the speed of the turbine—assuming, as before, a planetary gear ratio of one-to-four, an engine speed of 2000 revolutions per minute, and a propeller speed of 500 revolutions per minute—would be 500 revolutions per minute, plus one-fourth of the difference between the engine speed and the propeller shaft speed—namely, a total of 875 revolutions per minute—thus making a speed difference between the impeller and turbine of only 1125 revolutions per minute as against 1500 revolutions per minute, which would be the difference without the planetary gear system. If, to carry the explanation further along these lines, the propeller shaft rises to 1000 revolutions per minute, the driven shaft speed remaining at 2000 revolutions per minute, the speed of the turbine would be, instead of 1000 revolutions per minute as would be the case were it directly connected to the propeller shaft—1250 revolutions per minute—that is, 1000 revolutions per minute (the speed of the propeller shaft) plus one-fourth of the difference in speeds between driving shaft and propeller shaft—namely, 250 revolutions per minute. Obviously, if the planetary gear ratio be decreased, the speed difference between turbine and impeller would be correspondingly decreased. In other words, the difference between impeller and turbine speeds is always the difference between driving shaft and propeller shaft speeds, plus the latter difference multiplied by the planetary gear ratio.

When the device is used as an automobile transmission—and probably in the case of many other uses—it is often desirable to permit it to operate as a fluid clutch. Such conditions would exist in case the automobile were traveling on a level or fairly level road, except when occasion arose for rapid acceleration requiring torque multiplication. To meet this condition, I have provided the brake mechanism composed of the drum 33 and the brake band 34 with its operative connections for releasing the guide members 13 and 14, thus eliminating from the latter their reaction function and permitting the device to work after the well-known manner of a fluid clutch. One of the advantages thus obtained, especially in the case of an automobile, is the prevention of engine racing under driving conditions in which torque multiplication is not frequently required. In fact, under some conditions, it may be desirable to control rotation of the guide members on the sleeve 17 in both directions of rotation. This may be accomplished by eliminating the one-way or the overrunning clutches 15 and 16, making the guide members fast with the sleeve 17. The brake band 34 may then be maintained in engagement with the brake drum 33 when the device is operating as a torque multiplying device and may be released when it is operating at the most efficient relative speeds of impeller and turbine, which, in the case of an automobile installation, would ordinarily be one-to-one speed ratio of driving and driven shafts or approximately so.

Also, in the application of the invention to an automobile transmission, it is desirable that provision be made for reversing the direction of rotation of the propeller shaft for backing the vehicle. This is accomplished in the present device by applying the brake band 36 to the brake drum 22 whereby the orbital motion of the gears 20 is prevented, with the result that they act merely as intermediate gears between the gears 23 on the driven shaft and the internal gear 24 on the propeller shaft. In other words, when the brake band 36 is applied, the connection between the driving shaft 3 and the propeller shaft 25 is entirely a mechanical one, the planetary gear system then causing reverse rotation of the propeller shaft.

Another instance, more particularly characteristic of an automobile, in which a direct mechanical connection between propeller shaft and driving shaft is of advantage, is when it is desired to start the engine by pushing the vehicle, such necessity arising, for instance, when the usual engine starting mechanism fails for one reason or another to function. This purpose may be accomplished by providing the one-way clutch hereinbefore referred to with the rollers 29 between the flange 40 projecting from the ring gear 24, which serves as an outer clutch race, and the roller race 30, the clutch preventing the internal gear from rotating on the roller race 30 in the direction of rotation of the driving shaft and at a faster rate but permitting it to freely rotate in the opposite direction. Another contingency against which it is desirable to make provision is resistance to starting of the engine in cold climates where the oil or other working substance becomes viscous at low temperatures. By providing the mechanism hereinbefore described for entirely freeing the internal gear train, the entire mechanism, comprising the impeller, the turbine, and the guide members, may rotate as a unit without imposing any load on the engine due to action of the working substance.

I claim:

1. A torque multiplying device comprising an impeller, a turbine positioned to be actuated by the impeller, guide members positioned and adapted to react against the energy of the liquid delivered by the impeller, a driven shaft, means for inversely varying the fractional part of turbine power output applied to the driven shaft as the angular speed difference between the impeller and the turbine varies, said means comprising a planetary gear connection between the impeller, turbine, and driven shaft, said planetary gear connection comprising a sun gear mounted on the impeller shaft, a ring gear carried by the driven shaft, and an intermediate gear carried by the turbine.

2. A torque multiplying device comprising an impeller, a turbine of the reaction type positioned to be actuated by the impeller, guide members positioned and adapted to react against the energy of the liquid delivered by the impeller, a driven shaft, means interposed between the impeller and the driven shaft adapted for decreasing the fractional part of turbine power output transmitted to the driven shaft as the angular speed difference between the impeller and turbine increases, said means comprising a gear connection between the impeller and the driven shaft, including a gear adapted to be driven by the turbine, said gear also transmitting power to the driven shaft and reacting on the impeller to urge it in its direction of rotation.

3. A torque multiplying device comprising an impeller, a turbine positioned to be accelerated by the impeller, guide members positioned and adapted to react against the energy of the liquid delivered by the impeller, a driven shaft, and a planetary gear system, one member of which is connected to the turbine, another member of which is connected to the impeller, and another member of which is connected to the driven shaft, the respective gears being connected to the respective parts so that the power output of the turbine is distributed between the impeller and the driven shaft in a ratio which varies inversely with the difference in speeds between the impeller and the turbine.

4. A torque multiplying device comprising a driving shaft, an impeller mounted on the driving shaft, a turbine positioned to be actuated by the impeller and rotatably mounted on the driving shaft by means of a sleeve, means for distributing the power output of the turbine between the impeller and the driven shaft in a ratio which varies inversely with the difference in speeds between the impeller and the turbine, said means comprising a train of planetary gears the central one of which is non-rotatably mounted on the driving shaft, the intermediate of which is mounted on the sleeve, and the outer of which is mounted on the driven shaft.

5. A torque multiplying device comprising a driving shaft, an impeller mounted on the driving shaft, a turbine positioned to be driven by the impeller and rotatably mounted on the driving shaft by means of a sleeve, a train of planetary gears the central one of which is non-rotatably mounted on the driving shaft, the intermediate of which is mounted on the sleeve, and the outer of which is mounted on the driven shaft, a second sleeve rotatably mounted on the first named sleeve, a guide member mounted on the said second sleeve in position to react against the energy in the liquid delivered by the impeller, and means for preventing rotation of the second sleeve at will.

6. In a torque multiplying device, a driving shaft, an impeller carried by the driving shaft, a turbine rotatably mounted on the driving shaft, a reaction member also rotatably mounted on the driving shaft, means for distributing the power output of the turbine between the impeller and the driven shaft in a ratio varying inversely with the difference in speeds between the impeller and turbine, said means comprising an intermediate gear of a planetary gear system carried by the turbine, an outer gear of said system carried by the driven shaft, a central gear of said system carried by the driving shaft, and means for preventing at will rotation of the turbine.

7. In a torque multiplying device, a driving shaft, an impeller carried by the driving shaft, a turbine rotatably mounted on the driving shaft, a reaction member also rotatably mounted on the driving shaft, an intermediate gear of a planetary gear system carried by the turbine, an outer gear of said system carried by the driven shaft, a central gear of said system carried by the driving shaft, means for preventing at will rotation of the turbine, and means for permitting at will rotation of the reaction member.

8. A torque multiplying device comprising a driving shaft, an impeller, a turbine rotatably mounted by means of a sleeve on the driving shaft, a planetary gear system connecting the turbine with the driven shaft, a brake drum carried by the said sleeve, a brake band, means for applying the brake band to the drum at will to prevent orbital motion of the intermediate gear carried by the turbine whereby the driven shaft may be caused to rotate in a direction opposite to the direction of rotation of the driving shaft, a second sleeve rotatably mounted on the first-mentioned sleeve, a reaction member mounted on the second named sleeve by means of an overrunning clutch mechanism, a brake drum carried by the second mentioned sleeve, a brake band, and means for applying the brake band to the said brake drum at will to permit the reaction member to rotate freely in both directions.

9. A torque multiplying device comprising an impeller, a turbine, reaction members cooperating with the impeller and turbine, a driving shaft and a driven shaft, means for effecting distribution of the power output of the turbine as between the impeller and the driven shaft in a ratio which varies inversely with the difference in speeds between the impeller and the turbine, said means comprising a planetary gear connection between the driving shaft and the driven shaft, the outer gear of which is mounted on the driven shaft and the inner gear on the driving shaft, and the intermediate gear on the turbine, and means for preventing orbital motion of the intermediate gear whereby the driven shaft may be caused to rotate in a direction opposite to the direction of rotation of the driving shaft.

10. A torque multiplying device comprising an impeller, a turbine positioned to be actuated by the impeller, guide members positioned and adapted to react against the energy of the liquid delivered by the impeller, a driven shaft, means carried by the driven shaft whereby rotary motion may be imparted to it, means carried by the driving shaft adapted for transmitting a torsional force, and means carried by the turbine and operatively interposed between the two first-mentioned means cooperating with the same whereby the fractional part of the total power output of the turbine that is transmitted to the driven shaft decreases as the speed difference between the turbine and impeller increases.

11. A torque multiplying device comprising an impeller, a turbine of the impulse type positioned to be actuated by the impeller, guide members positioned and adapted to react against the energy of the liquid delivered by the impeller, a driven shaft, and means including a differential gear train adapted for decreasing the fractional part of turbine power output applied to the driven shaft as the angular speed difference between the impeller and turbine increases.

12. A transmission comprising a driving shaft, an impeller actuated by said shaft, a turbine actuated by said impeller, guide members adapted to react against the energy delivered by said impeller and to transmit it to the turbine, a driven shaft, a planetary gear set comprising a sun gear, a planet gear, and an orbit gear, a carrier for said planet gear, the said sun gear being mounted on the driving shaft, the said orbit gear being mounted on the driven shaft, and the said carrier being connected to said turbine, whereby the fractional part of the total power output of the turbine that is transmitted to the driven shaft decreases as the speed difference between the turbine and impeller increases.

13. A transmission comprising a driving shaft, an impeller actuated by said shaft, a turbine actuated by said impeller, guide members adapted to react against the energy delivered by said impeller and to transmit it to the said turbine, a driven shaft, a gear fixedly mounted on said driving shaft, a second gear fixedly mounted on said driven shaft, gear mechanism connecting said first and second gears and adapted to apply torque in the same direction to both said first and second gears, said gear connecting mechanism being carried by and adapted to be rotated orbitally by the rotation of said turbine, whereby the fractional part of the total power output of the turbine that is transmitted to the driven shaft decreases as the speed difference between the turbine and impeller increases.

JOHN O. GETTE, JR.